(12) United States Patent
Gatzemeyer

(10) Patent No.: US 6,892,467 B1
(45) Date of Patent: May 17, 2005

(54) METHOD AND APPARATUS FOR EDGE LOCATING AND ANGLE SETTING

(76) Inventor: Dwight Gatzemeyer, 8521 Chaparral Cir., Lincoln, NE (US) 68520

( * ) Notice: Subject to any disclaimer, the term of this patent is extended or adjusted under 35 U.S.C. 154(b) by 0 days.

(21) Appl. No.: 10/327,032

(22) Filed: Dec. 20, 2002

(51) Int. Cl.$^7$ .......................... G01D 21/00; B43L 13/00
(52) U.S. Cl. .............................. 33/613; 33/422; 33/424; 33/451; 33/471; 33/644
(58) Field of Search ............................ 33/1 BB, 1 CC, 33/418, 422, 424, 465, 451–452, 471, 474, 531–538, 644, 613

(56) References Cited

U.S. PATENT DOCUMENTS

| | | |
|---|---|---|
| 732,827 A | 7/1903 | Chambers |
| 1,128,673 A | 2/1915 | Foner |
| 1,650,553 A | 11/1927 | Tresidder |
| 2,515,761 A * | 7/1950 | De Juhasz ..................... 33/422 |
| 2,755,556 A * | 7/1956 | Lindenbein ................... 33/418 |
| 3,109,239 A * | 11/1963 | Wicker et al. ............. 33/1 BB |
| 3,861,088 A | 1/1975 | Greico ........................ 51/216 |
| 4,398,349 A | 8/1983 | Bailey ................... 33/174 TA |
| 4,434,559 A | 3/1984 | Lauer et al. ............. 33/174 L |
| 4,481,720 A | 11/1984 | Sury ........................... 33/451 |
| 4,736,524 A * | 4/1988 | King ........................... 33/451 |
| 4,745,689 A | 5/1988 | Hiltz ........................... 33/451 |
| 4,922,621 A | 5/1990 | Maier .......................... 33/465 |
| 4,995,169 A | 2/1991 | Lunden ........................ 33/534 |
| 5,046,262 A | 9/1991 | Kerbaugh ..................... 33/644 |
| 5,337,489 A * | 8/1994 | Mustafa ....................... 33/832 |
| 5,419,053 A * | 5/1995 | Kathan ........................ 33/417 |
| 5,522,147 A | 6/1996 | Tully ........................... 33/567 |
| 5,586,395 A | 12/1996 | Malczewski ................ 33/471 |
| 5,809,659 A * | 9/1998 | Martin ........................ 33/451 |
| 6,314,652 B1 * | 11/2001 | English ....................... 33/421 |
| 6,453,568 B1 * | 9/2002 | Hymer ........................ 33/276 |
| 6,543,144 B1 * | 4/2003 | Morin ..................... 33/27.032 |

* cited by examiner

*Primary Examiner*—Diego Gutierrez
*Assistant Examiner*—Yaritza Guadalupe
(74) *Attorney, Agent, or Firm*—Thomte, Mazour & Niebergall; Shane M. Niebergall

(57) ABSTRACT

An improved tool is provided for locating the corner or edge of a workpiece while setting the workpiece at a desired angle with respect to a work surface. An elongated arm member slidably engages an elongated base member at one end, allowing for the measurement of the distance between the opposite end portions of the arm and base member and calculation of the angle at which the workpiece is disposed. The base member is provided with generally opposing first and second mating surfaces for locating the corner or edge of the workpiece. Different embodiments are provided for use in finding edges of workpieces having various angles. Different embodiments further provide for the use of multiple measuring instrumentalities and calculations.

18 Claims, 8 Drawing Sheets

METHOD AND APPARATUS FOR EDGE LOCATING AND ANGLE SETTING

BACKGROUND OF THE INVENTION

1. Field of the Invention

The present invention relates to devices capable of positioning and precisely locating an edge of a workpiece relative to the work surface of a machine tool and more particularly to a hand-held device for locating the edge of a workpiece and positioning the workpiece at an angle in relation to the work surface of various work tools such as drills, milling tools, and grinders.

2. Description of the Prior Art

In machine shops that use milling tools and the like, it is often required to set a part or workpiece on a machine for the purpose of machining the workpiece to a required angle or for inspection. However, when the workpiece is disposed at an angle and the machining is to be performed, the corner or edge of the workpiece is often difficult to locate.

Presently, a machinist may use a sine bar or similar device to set the angle of the part. The machinist must then use a second tool to locate the corner or edge of the part in order to proceed with the machining operation. Typically, a machinist may take a steel ball or other such spherical object and remove one quadrant of the sphere to form a tool for locating the edge of the workpiece. This type of tool is frequently referred to as a "Pac Man" ball because of its resultant shape. In use, the Pac Man ball is placed on the corner of the workpiece, and an Indicator is "swung" at the periphery (or as close as practical) of the ball to align the spindle of the machine with the corner of the part.

U.S. Pat. No. 5,046,262 discloses a spherical edge locator that is used in the manner described above for locating an edge of a workpiece. While the spherical edge locator is more refined than the Pac Man ball, it lacks the ability to set the angle of the workpiece.

Accordingly, the shortcomings of the prior art make it necessary to use more than one device and at times more than one person in order to locate an edge or corner on a workpiece while setting it at the desired angle. Accordingly, what is needed is a simple hand tool that is easy to use for locating the edges and corners of workpieces as well as setting the angle of the workpieces with respect to a working surface.

SUMMARY OF THE INVENTION

A device for locating the edge or corner of a workpiece is provided with an elongated base member having opposite ends and upper and lower surfaces. The lower surface of the base member is provided with first and second mating surfaces for releasably engaging first and second planar surfaces of the workpiece. In one embodiment, the first and second mating surfaces of the base member are disposed in a fixed perpendicular relationship with one another for locating a 90° corner or edge of the workpiece. In another embodiment, a plate member is slidably engaged with the base member at one end. In use, the base member is placed adjacent the workpiece, and the plate member is slid outwardly from the base member in a semicircular fashion until it engages the second planar surface of the workpiece. The plate member allows the device to locate the corner or edge of a workpiece of greater or less than 90°.

The device is further provided with an elongated arm having upper and lower surfaces. The lower surface of the arm is slidably engaged with the top surface of the base member at one end. In one embodiment, the arm and base members are slidably engageable with one another to permit the insertion of gauge blocks or similar structures between the opposing end portions of the arm and base members. To set the workpiece at a desired angle with respect to the work surface, the sine of the desired angle is calculated and then multiplied by a constant, which is associated with the subject device. The calculation provides the user with the size of gauge blocks required to be disposed between the arm and base members. Once the gauge blocks are in position, a level vial, disposed within the upper surface of the arm member is used to level the device, thus disposing the workpiece at the desired angle.

In another embodiment, the opposing end portions of the arm and base members are shaped for use with a micrometer or similar tool to adjust the arm member with respect to the base member. Once the arm and base members are in position, a level vial provided in the upper surface of the arm member is used to level the device, orienting the workpiece at the desired angle.

Various combinations of the above embodiments provides for a hand-held tool for locating the edge or corner of a workpiece and disposing the workpiece at a desired angle with respect to a work surface.

Accordingly, it is one of the principal objects of the present invention to provide an improved tool for use in locating the edge or corner of a workpiece.

It is a further object of the present invention to provide a hand tool for setting the angular relationship of a workpiece with respect to a work surface.

Yet another object of the present invention is to provide an improved tool that can both locate the edge or corner of a workpiece and set the workpiece at a desired angle with respect to a work surface.

Still another object of the present invention is to provide a tool for locating the edge or corner of a workpiece and setting the angular relationship of the workpiece with respect to a work surface that is compact and easily portable.

A further object of the present invention is to provide an improved tool for locating the corner or edge of a workpiece and disposing the workpiece at a desired angle with respect to a work surface that is easy to operate.

These and other objects will be apparent to those skilled in the art.

DESCRIPTION OF THE PREFERRED EMBODIMENT

Figure 1:
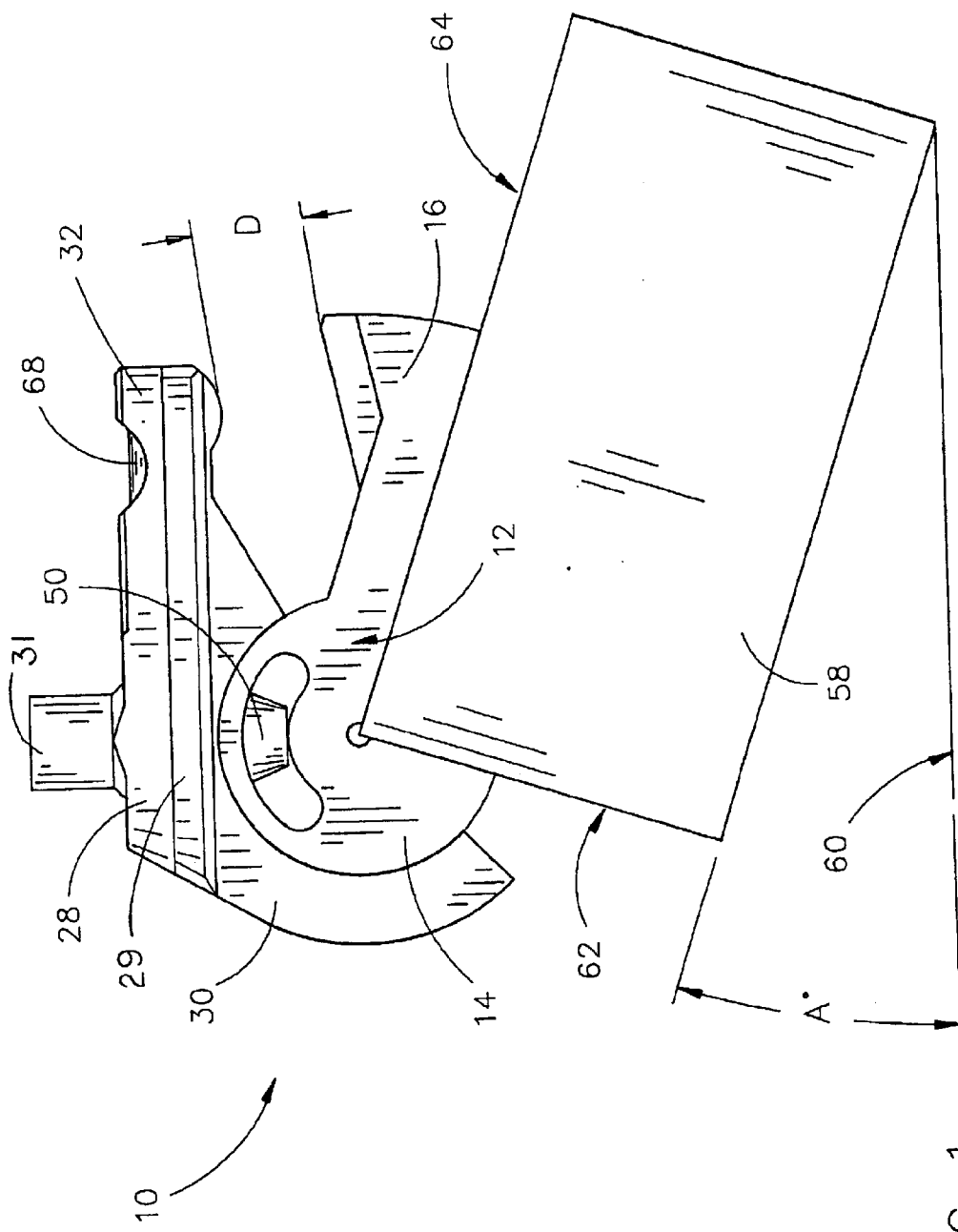
FIG. 1 is a side elevation view of one embodiment of the present invention as the same would be used to find the 90° corner or edge of a workpiece while setting the workpiece at a desired angle with respect to a work surface.
Figure 2A:
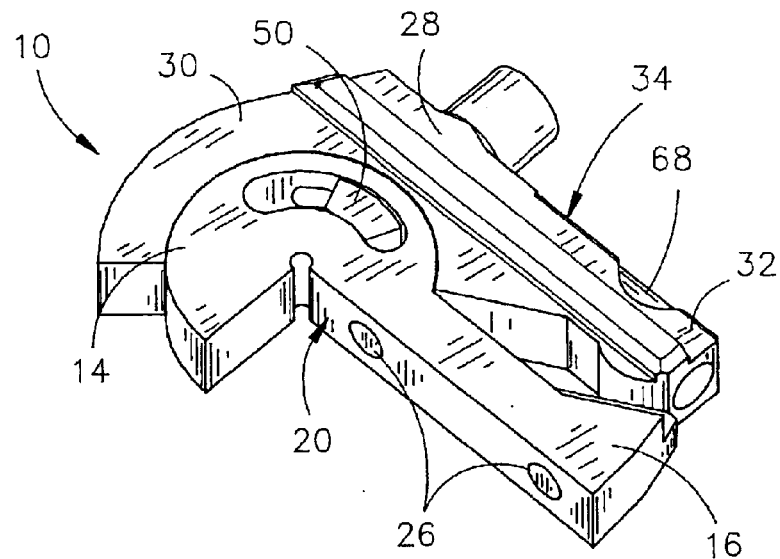
FIG. 2A is a perspective view of the embodiment of the present invention of FIG. 1.
Figure 2B:
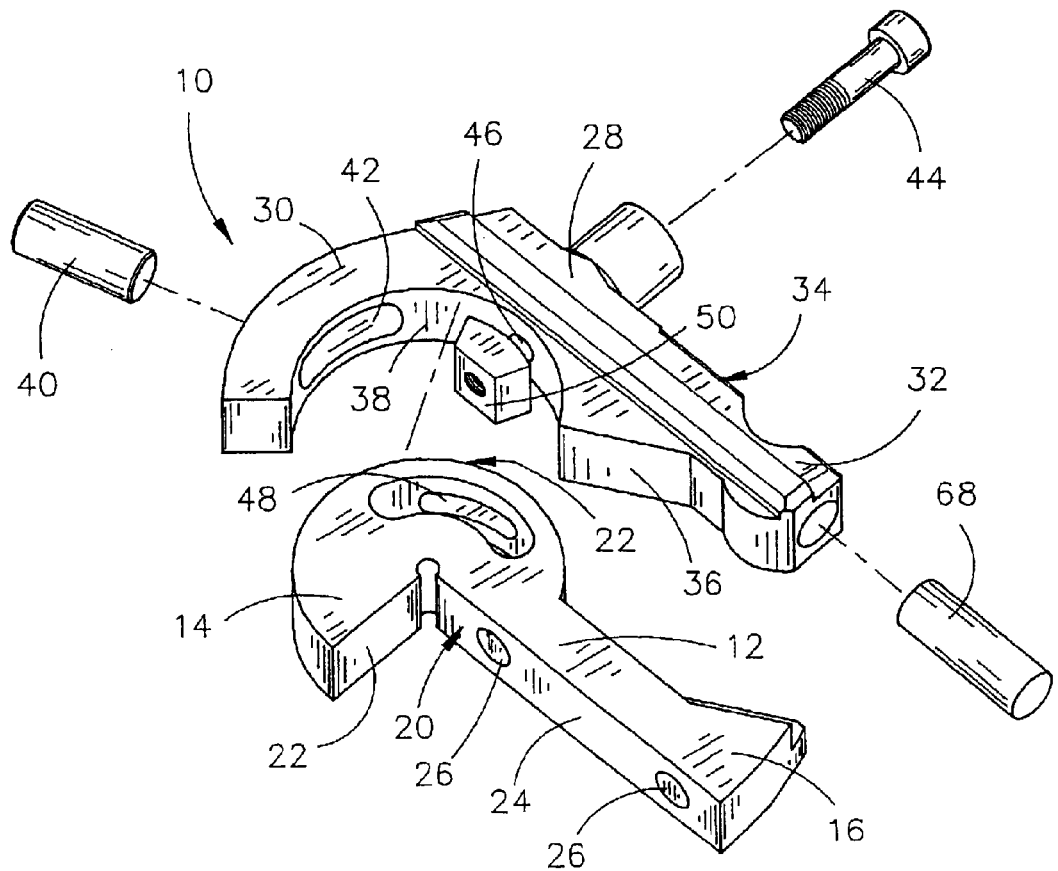
FIG. 2B is an exploded perspective view of the embodiment of the present invention of FIG. 1.

The tool of this invention is referred to generally by the reference numeral 10 and includes a base member 12 having a first end portion 14, a second end portion 16, and upper surface 18 and lower surface 20. The lower surface 20 is provided with a first engagement face 22 and a second engagement face 24. The second engagement face 24 is preferably provided with one or more magnets 26 that are disposed flush within the second engagement face 24.

The tool 10 is further provided with an arm member 28 having a first end 30, a second end 32, an upper surface 34, and a lower surface 36. The lower surface 36 of the arm member 28 is pivotably connected to the upper surface 22 of the base member 12 so that the second end portion 32 of the arm member 28 can be selectively moved between generally open and generally closed positions with respect to the second end portion 16 of the base member 12. FIG. 1 depicts the tool 10 with the arm member 28 in a generally open position.

Although it is contemplated that the arm member 28 and the base member 12 could be pivotably coupled together using a pivot pin or similar structure, it is preferred that the first end 14 of the base member 12 be generally disc-shaped and the lower surface 36 of the arm member 28 be provided with a generally circular collar 38 adjacent the first end 30. The collar portion 38 is sized to pivotably slidably receive the disc-shaped first end 14 of the base member 12. A set pin 40 is provided to be disposed through an elongated opening 42 formed in the first end 30 of the arm member 28 and be secured to the first end 14 of the base member 12. The set pin 40 assists in the alignment of the arm member 28 with respect to the base member 12 and further limits the pivoting range of motion between the two structures. A bolt member 44 is preferably provided to be disposed through an opening 46 formed in the arm member 28 and into the elongated opening 48 formed within the first end portion 14 of the base member 12. The bolt member 44 is releasably engaged by a receiving member 50 disposed within the elongated opening 48. Accordingly, tensioning of the bolt member 44 with respect to the receiving member 50 tightens the frictional engagement between the disc-shaped first end 14 of the base member 12 with the collar portion 38 to secure the position of the arm member 28 with respect to the base member 12.

Figure 3:
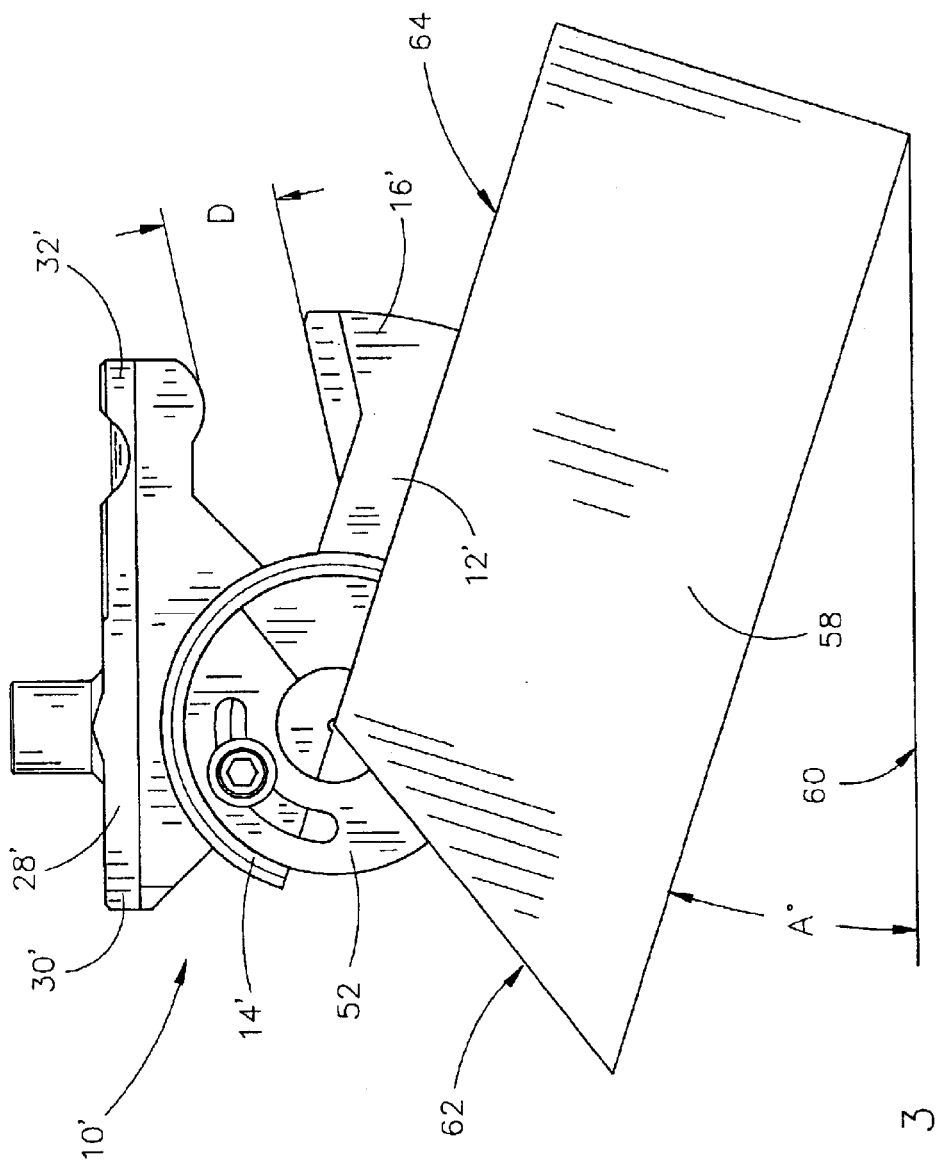
FIG. 3 is a side elevation view of another embodiment of the present invention as the same could be used to locate the corner of a workpiece that is greater than 90° while setting the workpiece at a desired angle with respect to a work surface.
Figure 4A:
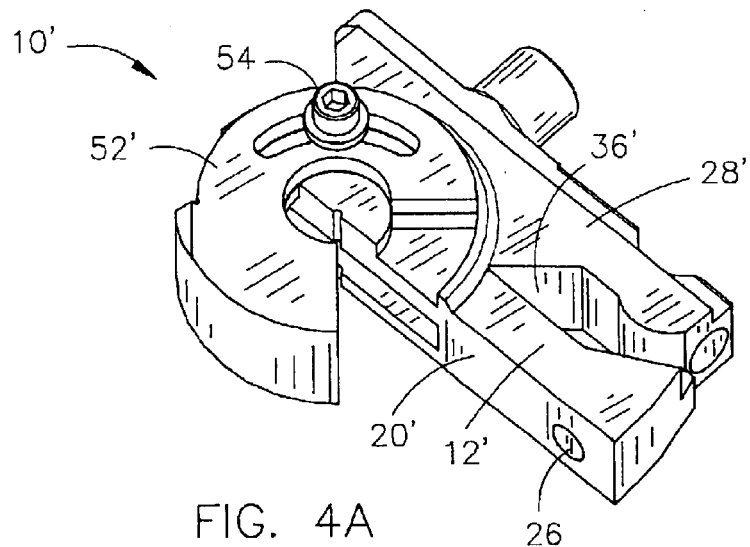
FIG. 4A is a perspective view of the embodiment of the present invention of FIG. 3.
Figure 4B:
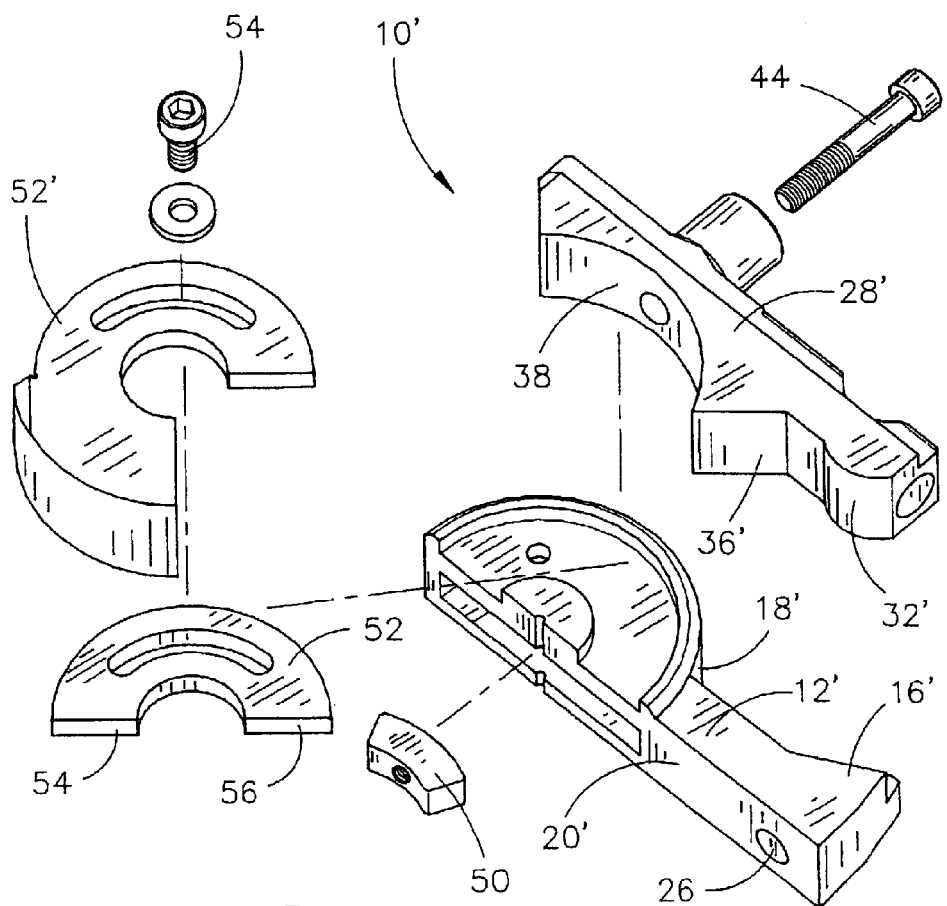
FIG. 4B is a perspective exploded view of the embodiment of the present invention of FIG. 3.

The tool 10 depicted in FIGS. 1, 2A, 2B, 5, 6A and 6B is shown having a first engagement face 22 and second engagement face 24 that are set in a 90° position with respect to one another. However, in an alternate embodiment, the tool 10' is provided with a plate member 52 that is slidably connected to the first end portion 14 of the base member 12. The plate member 52 is preferably semicircular in shape so that it will move in an arcing path outwardly from the base member 12. The plate member 52 is provided with opposite side portions 54 and 56. In its preferred engagement with the base member 12, the side portion 54 of plate member 52 forms at least a portion of the first engagement face 22. Accordingly, with the use of plate member 52, the angular relationship of first engagement face 22 with respect to second engagement face 24 can be selectively positioned between angles ranging from 0° to 1800. However, an optional plate member 52' can be provided in place of plate member 52. Plate member 52', while semicircular, actually completes three-quarters or more of a circular shape. Plate member 52' is preferably used for disposing the first engagement face 22 with respect to the second engagement face 24 at angles less than 90°. A bolt member 54 is provided for connecting plate members 52 and 52' to the first end 14' of the base member 12'. The bolt member 54 further serves as a structure for aligning and limiting the movement of the plate members 52 and 52' with respect to the base member 12'. FIG. 3 depicts one possible manner in which the tool 10' can be so adjusted.

In use, the tool 10 of the present invention is useful for quickly and easily locating the corner or edge of a workpiece 58 and then setting the angle at which the workpiece 58 is disposed with respect to a work surface 60. To locate the corner or edge of the workpiece 58, the lower surface 20 of the base member 12 is positioned closely adjacent the workpiece 58 so that the first engagement face 22 is positioned closely adjacent a first generally planar surface 62 of the workpiece 58, and the second engagement face 24 is closely adjacent a second generally planar surface 64 of the workpiece 58. With the tool 10 in this position, the corner or edge of the workpiece is easily located at the point where the first engagement face 22 and the second engagement face 24 meet. For those applications where the workpiece has a corner or edge that is greater or less than 90°, the plate member 52 or 52' is simply moved in an outward direction from the base member 12' until the first engagement surface 22 is positioned closely adjacent the first generally planar surface of the workpiece 58.

To set the angle of the workpiece 58 with respect to the work surface 60 using the tool 10 or 10', the user first calculates the sine of the desired angle. For example purposes, the workpiece 58 depicted in FIGS. 1 and 3 is set at an A° angle with respect to the work surface. The sine of the angle can be calculated using a calculator or other such processing device or simply obtained from a standard sine table.

The arm member 28 has a known functional length, which in this example, depicted in FIGS. 1 and 3, is 2 inches (measured from a point representing the center of the circular portion of first end portion 30 to the second end portion 32). It is contemplated that the functional length of the arm member 28 and the remaining dimensions of the tool 10 could be provided in virtually any size. It is preferred, however, that the dimensions chosen provide a compact tool for use and a functional length that will simplify the calculations performed using this method. The sine of the angle must be multiplied by the functional length of the arm member 28. The resulting number represents the distance "D" in which the second end 32 of the arm member 28 must move away from the second portion 16 of the base member 12. The arm member 28 is preferably moved the derived distance from the base member 12 using one or more gauge blocks or other similar structure having a precise known thickness. With the arm member 28 in its generally open position with respect to the base member 12, the bolt member 44 can be used to secure the position.

The tool 10 is then positioned closely adjacent the workpiece 58, locating the edge to be aligned with the work surface. The workpiece 58 is then lifted to increase its angular relationship with respect to the work surface 60 until the arm member 28 is substantially horizontally disposed. A level vial 68 can be secured within the arm member 28 to provide the user with a quick method of orienting the tool 10 and the workpiece 58. The degree of accuracy required by the task at hand will dictate the type of level vial used. Once the arm member 28 is substantially horizontally disposed, the user may indicate the ledge 29 of the arm member 28 to accurately align the workpiece 58 with the axis of the machine being used and, thus, the angle of the workpiece has been set. It will be clear to those of skill in the art that the accuracy of the angular disposition of the workpiece is dependent upon the horizontal disposition of the work surface 60 when the level vial 68 is used exclusive of an indicator. However, in such cases and to the extent that the work surface 60 is not substantially horizontal, the level vial 68 should be calibrated accordingly. With the final position being set, indicating the alignment member 31 aligns the spindle of the machine with the corner of the workpiece 58.

In another embodiment, the tool 10" provides an alternate means for setting the angular relationship of the workpiece 58 with respect to the work surface 60, as depicted in FIGS. 5–8B. The substantial differences between the tool 10" and the tool 10 can be seen in the shape of the second end portion 32" of the arm member 28" and the second end portion 16" of the base member 12". The function and structure of the tool 10" and tool 10''' for locating the edge or corner of the workpiece 58 is essentially the same as the structure and function of tool 10 and tool 10' hereinabove.

Figure 5:
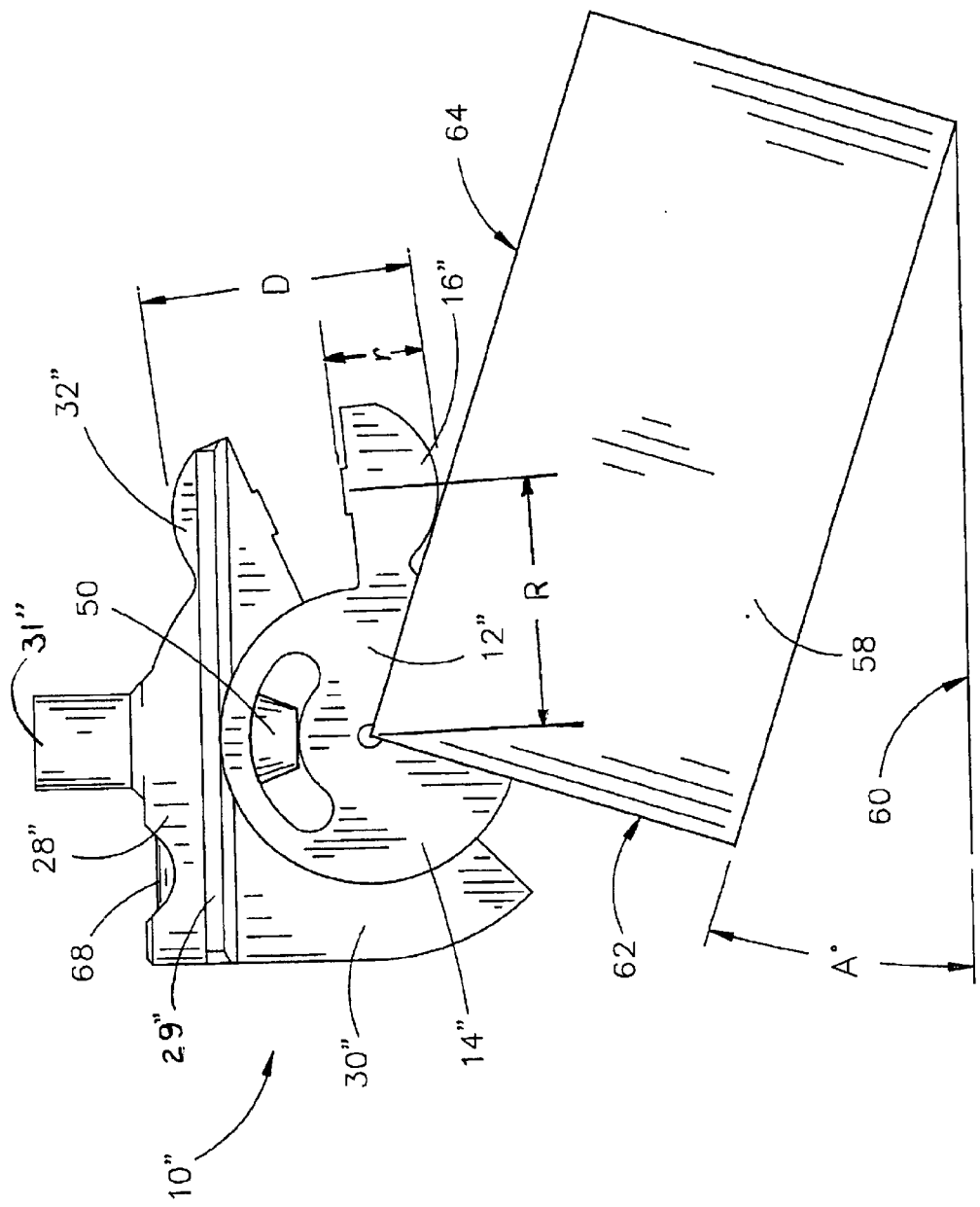
FIG. 5 is another embodiment of the present invention as the same could be used to find the 90° corner or edge of a workpiece while setting the workpiece at a desired angle with respect to a work surface.
Figure 6A:
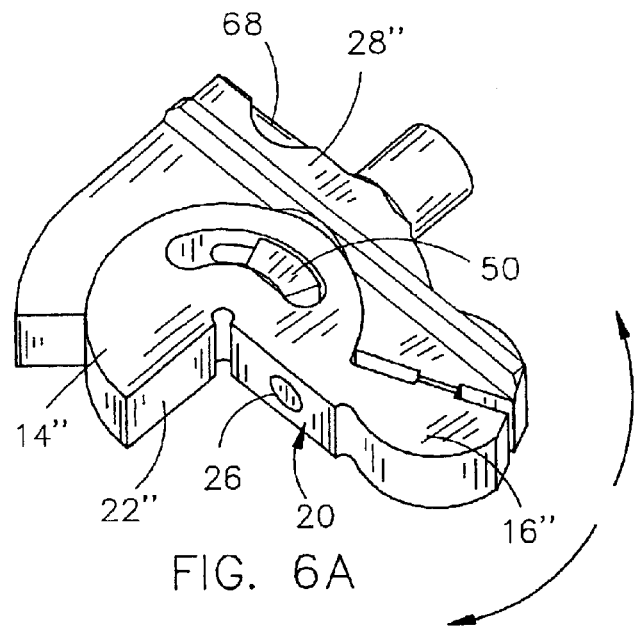
FIG. 6A is a perspective view of the embodiment of the present invention of FIG. 5.
Figure 6B:
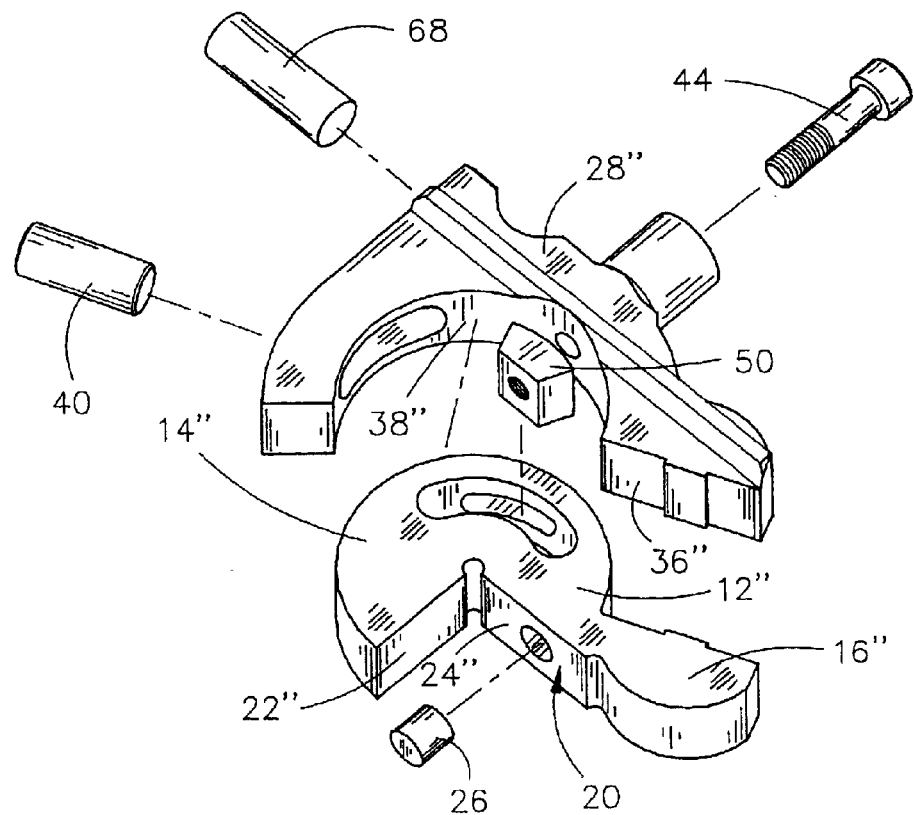
FIG. 6B is a perspective exploded view of the embodiment of the present invention of FIG. 5.
Figure 7:
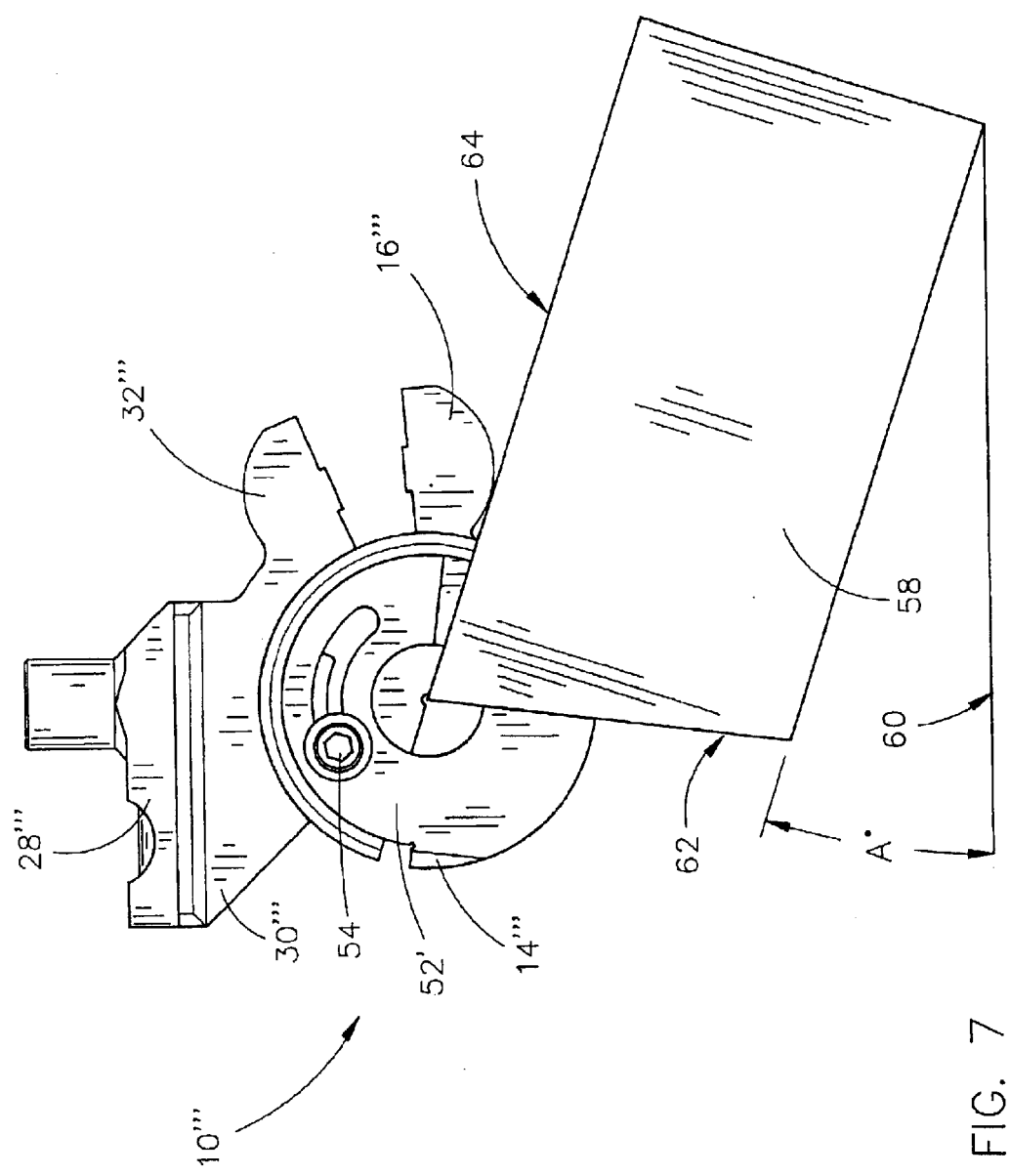
FIG. 7 is a side elevation view of another embodiment of the present invention as the same could be used to locate the corner of a workpiece that is less than 90° while setting the workpiece at a desired angle with respect to a work surface.
Figure 8A:
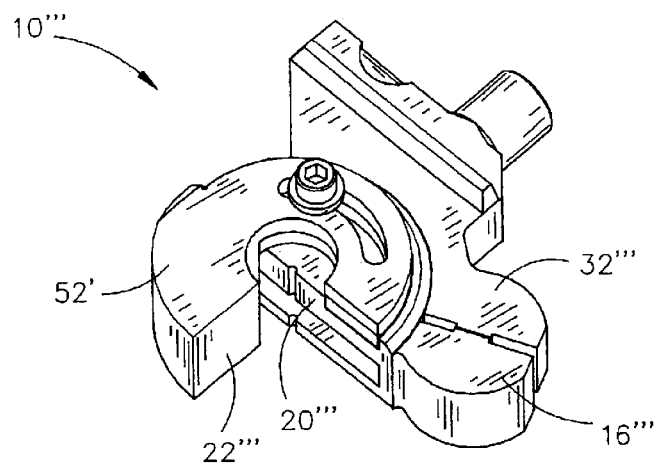
FIG. 8A is a perspective view of the embodiment of the present invention of FIG. 7.
Figure 8B:
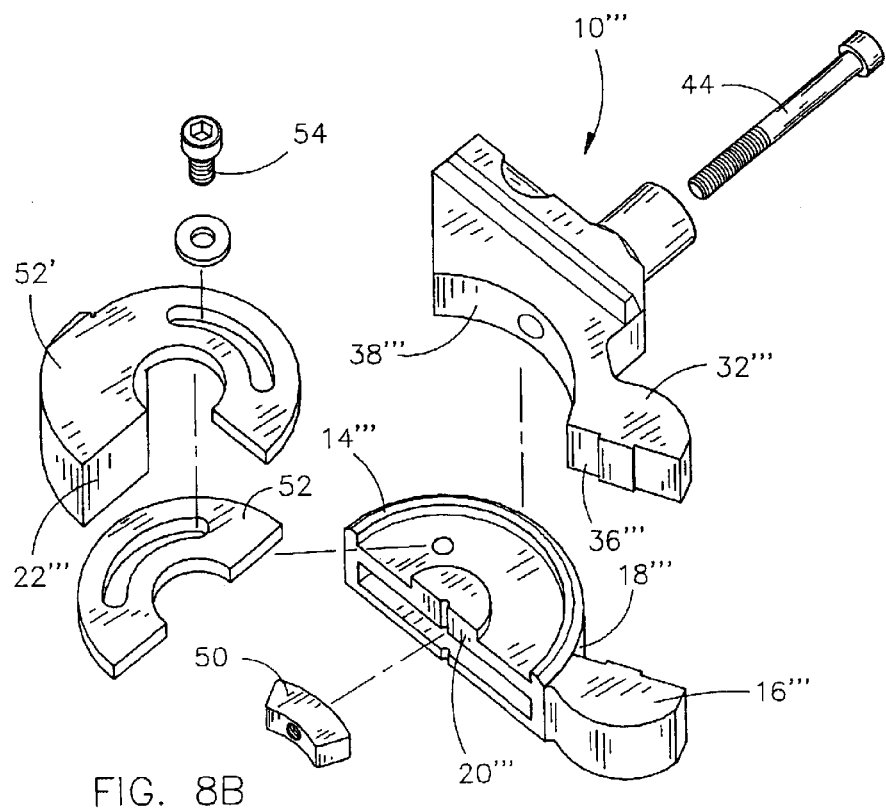
FIG. 8B is a perspective exploded view of the embodiment of the present invention of FIG. 7.

To set the angular relationship of the workpiece 58 with respect to the work surface 60 using tool 100" or tool 10''', the desired angle ("A") is inserted into the formula (sine (A°/2)*R+r)*2), which is derived from the geometry and size of the tool 10" as shown in FIG. 5. The resulting number provides the user with the distance "D" representing the distance in which the second end portion 32''' of the arm member 28''' should be moved away from the second end portion 16''' of the base member 12'''. This dimension can be set using a micrometer or other similar device. With the arm member 28''' in its generally open position, the bolt member 44 can be tightened to secure the final position. The tool 10''' is then positioned closely adjacent the workpiece 58 to locate the edge. Magnet 26 will help secure the position of the tool 10''' with respect to a metal workpiece. The workpiece 58 is then lifted to increase the angular relationship of the workpiece 58 with respect to the work surface 60 until the arm member 28''' is substantially horizontally disposed. As discussed hereinbefore, a level vial can be used to quickly set the workpiece 58, indicating the ledge 29''' to accurately align the workpiece 58 with the machine axis, achieving a final position.

In the drawings and in the specification, there have been set forth preferred embodiments of the invention; and although specified items are employed, these are used in a generic and descriptive sense only and not for purposes of limitation. Changes in the form and proportion of parts, as well as substitute of equivalents, are contemplated as circumstances may suggest or render expedient without departing from the spirit or scope of the invention as further defined in the following claims.

Thus, it can be seen that the invention accomplishes at least all of its stated objectives.

I claim:

1. A tool for working with a workpiece, comprising:
   a base member having first and second end portions, an upper surface and a lower surface; said lower surface of said base member having first and second engagement faces that are positioned adjacent one another so that they generally meet at a point of intersection and form a recess, which is shaped to releasably engage first and second generally planar surfaces on the workpiece that are positioned adjacent one another to form an edge or a corner of the workpiece; and
   an arm member having first and second end portions, an upper surface and a lower surface;
   said lower surface of said arm member being operatively pivotably connected to the upper surface of said base member so that said arm member generally pivots about an axis that extends through said point of intersection and perpendicular to said first and second engagement faces, which permits said second end portion of said arm member to moved between generally open and generally closed positions with respect to the second end portion of said base member.

2. The tool of claim 1 further comprising a level vial operatively connected to the upper surface of said arm member.

3. The tool of claim 1 further comprising means for securing said arm member in said generally open or generally closed positions.

4. The tool of claim 1 wherein the first end portion of said base member is generally disc-shaped.

5. The tool of claim 4 wherein the first end portion of the bottom surface is shaped to have a generally semicircular collar portion; said collar portion being shaped to slidably pivotably move with respect to the disc-shaped first end portion of said base member.

6. The tool of claim 4 wherein said base member is further comprised of a generally semicircular plate member, having opposite side portions, operatively slidably connected to the first end portion of said base member; at least one of the opposite side portions of said plate member forming at least a portion of the first engagement face of said base member.

7. The tool of claim 1 wherein the second end portion of said arm member and the second end portion of said base member are shaped to receive at lest one gauge block therebetween when said arm member is in said generally open position.

8. The tool of claim 1 wherein the second end portion of said arm member and the second end portion of said base member are shaped so that a micrometer can accurately measure the distance between the upper surface of the second end portion of said arm member and the lower surface of the second end portion of said base member when said arm member is in said generally open position.

9. A tool for working with a workpiece, having a corner portion, on a work surface, the tool comprising:
   a base member having a bottom surface and a top surface; said bottom surface of said base member comprising means for locating the corner portion of the workpiece;
   an elongated arm member operatively connected to the upper surface of said base member; and
   means for setting the angle of the workpiece with respect to the work surface.

10. The tool of claim 9 further comprising means for locating the corner of a workpiece, wherein the corner portion is disposed at an angle of greater than 0° but less than 180°.

11. A method of locating the edge of a workpiece and setting the workpiece at an angle with respect to a work surface, comprising the steps of:

providing a tool comprising a base member having first and second end portions, an upper surface and a lower surface having first and second engagement faces that are positioned adjacent one another to form a recess, which is shaped to releasably engage first and second generally planar surfaces on the workpiece that are positioned adjacent one another to form an edge or a corner of the workpiece, and an arm member having a functional length, first and second end portions, an upper surface and a lower surface;

placing the lower surface of said base member closely adjacent the workpiece until said first engagement face is engaged by a first generally planar surface on the workpiece and the second engagement face is engaged by a second generally planar surface on the workpiece so that said recess releasably engages a corner or edge formed by said first and second generally planar surfaces;

pivoting the arm member with respect to said base member so that the second end portions of said arm and base members move away from one another a known distance of separation to a generally open position;

pivoting the workpiece with respect to the work surface until said arm member is in a substantially horizontal position.

12. The method claim 11 further comprising the step of determining said known distance of separation by calculating the sine of the angle and multiplying the sine of the angle by said functional length of said arm member.

13. The method of claim 12 further comprising the steps of providing a plurality of gauge blocks and, after the step of calculating the known distance of separation, disposing at least one of said plurality of gauge blocks, having a thickness equal to said known distance, between the second end portions of said arm and base members so that the lower surface of said arm member and the upper surface of said base member engage said at least one of said plurality of gauge blocks.

14. The method of claim 11 further comprising the step of providing a plate member to be slidably pivotably connected to the first end portion of said base member so that at least a portion of said plate member forms the first engagement face of the lower surface of said base member and is selectively movable outwardly from said base member.

15. The method of claim 14 further comprising the step of moving said plate member outwardly from said base member until said plate member is positioned closely adjacent the first generally planar surface of the workpiece.

16. The method of claim 11 further comprising the step of providing a level vial operatively connected to said arm member to gauge the position of said arm member with respect to the horizontal.

17. The method of claim 11 further comprising the step of providing means for determining said known distance of separation so that said known distance of separation may be set by using a micrometer.

18. The method of claim 11 further comprising the step of providing means for locating the edge of the workpiece, where the angle at which the edge is disposed is unknown.

* * * * *